United States Patent
Marupaduga et al.

(10) Patent No.: US 10,827,551 B1
(45) Date of Patent: Nov. 3, 2020

(54) CONTROLLING CONFIGURATION OF DUAL-CONNECTIVITY BASED ON MOBILITY

(71) Applicant: Sprint Spectrum L.P., Overland Park, KS (US)

(72) Inventors: Sreekar Marupaduga, Overland Park, KS (US); Rajveen Narendran, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 53 days.

(21) Appl. No.: 16/260,651

(22) Filed: Jan. 29, 2019

(51) Int. Cl.
  *H04W 8/08* (2009.01)
  *H04W 24/08* (2009.01)
  *H04W 92/10* (2009.01)
  *H04W 4/02* (2018.01)
  *H04W 76/16* (2018.01)
  *H04W 40/24* (2009.01)

(52) U.S. Cl.
  CPC .......... *H04W 76/16* (2018.02); *H04W 4/027* (2013.01); *H04W 8/08* (2013.01); *H04W 24/08* (2013.01); *H04W 40/24* (2013.01); *H04W 92/10* (2013.01)

(58) Field of Classification Search
  CPC ............. H04W 36/0061; H04W 76/15; H04W 36/0069; H04W 36/30
  See application file for complete search history.

(56) References Cited

U.S. PATENT DOCUMENTS

| | | | |
|---|---|---|---|
| 7,349,699 B1 | 3/2008 | Kelly et al. | |
| 2018/0302827 A1* | 10/2018 | Mitsui | H04W 36/0061 |
| 2019/0098570 A1* | 3/2019 | Zhang | H04W 28/00 |
| 2020/0037217 A1* | 1/2020 | Shapiro | H04W 8/08 |

OTHER PUBLICATIONS

3rd Generation Partnership Project, 3GPP TR 37.716-00, V0.4.0 (May 2019), 51 pages (Year: 2019).*
3rd Generation Partnership Project, 3GPP TR 36.842 V0.2.0 (May 2013), 8 pages (Year: 2013).*

* cited by examiner

*Primary Examiner* — Un C Cho
*Assistant Examiner* — Peter K Mak

(57) ABSTRACT

When a UE is served with standalone-connectivity under a first radio access technology (RAT) in a cell site that also supports dual-connectivity service under the first RAT and a second RAT, a decision will be made as to whether to configure the dual-connectivity service for the UE, with the decision being based on whether the UE is moving threshold quickly. If the UE is moving at least predefined-threshold quickly, then, based at least on that fact, the decision will be to not configure the dual-connectivity service for the UE. Whereas, if the UE is not moving at least predefined-threshold quickly, then, based at least on that fact, the decision will be to configure the dual-connectivity service for the UE. The UE's serving network will then operate according to the decision, to control whether the UE is provided with dual-connectivity service.

18 Claims, 4 Drawing Sheets

_US 10,827,551 B1_

CONTROLLING CONFIGURATION OF DUAL-CONNECTIVITY BASED ON MOBILITY

BACKGROUND

A cellular wireless network typically includes a number of base stations or other access nodes, referred to without limitation as Node-Bs (NBs), that are configured to provide wireless coverage areas, such as cells and cell sectors, in which user equipment devices (UEs) such as cell phones, tablet computers, machine-type-communication devices, tracking devices, embedded wireless modules, and/or other wirelessly equipped communication devices (whether or not user operated) can operate. Each NB could be coupled with a core network that provides connectivity with various application servers and/or transport networks, such as the public switched telephone network (PSTN) and/or the Internet for instance. With this arrangement, a UE within coverage of the cellular network could engage in air interface communication with a NB and could thereby communicate via the NB with various application servers and other entities.

Such a network could operate in accordance with a particular radio access technology (RAT), with communications from the NBs to UEs defining a downlink or forward link and communications from the UEs to the NBs defining an uplink or reverse link.

Over the years, the industry has embraced various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each coverage area could operate on one or more carriers, each of which could be frequency division duplex (FDD), defining separate frequency channels for downlink and uplink communication, or time division duplex (TDD), with a single frequency channel multiplexed over time between downlink and uplink use. Further, on the downlink and uplink, each carrier could be structured to define various physical channels including time-frequency resources for carrying information between the NBs and UEs. For example, the air interface could be divided over time into frames, each divided in turn into subframes and timeslots, and the carrier bandwidth could be divided over frequency into subcarriers, which could be grouped within each timeslot to define physical resource blocks (PRBs) in which the subcarriers can be modulated to carry data.

The NB could then be configured to coordinate use of these air-interface resources on an as-needed basis. For example, when the NB has data to transmit to a UE, the NB could allocate particular downlink air-interface resources to carry that data and could accordingly transmit the data to the UE on the allocated downlink resources. And when a UE has data to transmit to the NB, the UE could transmit to the NB an uplink resource request, the NB could responsively allocate particular uplink air-interface resources to carry the data, and the UE could then transmit the data to the NB on the allocated uplink resources.

Overview

In a representative arrangement, the core network with which a NB is connected includes a user-plane subsystem, such as a Serving Gateway (SGW) and Packet Data Network Gateway (PGW), or a User Plane Function (UPF), that provide connectivity with a transport network such as the Internet. Further, the representative core network includes a control-plane subsystem, such as a Mobility Management Entity (MME), or Access and Mobility Management Function (AMF) and Session Management Function (SMF).

When a UE enters into coverage of such a system, the UE could detect threshold strong coverage of a NB (e.g., a threshold strong reference signal broadcast by the NB). In turn, the UE and NB could then engage in control signaling (e.g., pursuant to the Radio Resource Control (RRC) protocol) to establish a connection (e.g., an RRC connection) through which the NB will serve the UE. And the NB could establish for the UE a context record indicating an identity of the established connection.

Further, if the UE is not already registered for service with the core network, the UE could transmit to the NB an attach request, which the NB could forward to a core network control-plane node (e.g., MME or AMF/SMF) for processing. In response to the UE's attach request, the control node could then authenticate the UE and establish for the UE a context record indicating that the UE is served by the NB, thus effectively establishing for the UE a control-plane signaling path tied or homed to that NB. Moreover, the control-plane node could responsively engage in signaling with the NB and with a core-network user-plane node (e.g., SGW or UPF), to coordinate establishment for the UE of a user-plane access bearer that extends through the core network from the NB to a user-plane node (e.g., PGW or UPF), and the user-plane node could similarly establish for the UE a context record identifying the UE's established access bearer.

Once the UE is connected and registered with the network, the NB could then serve the UE in a connected mode, managing downlink communication of packet data to the UE and uplink communication of packet data from the UE. For example, when packet data for the UE arrives at the core network from a transport network, the data could flow over the UE's established access bearer to the NB, and the NB could then select downlink PRBs to carry the data to the UE and could coordinate transmission of the data to the UE within those downlink PRBs. Likewise, when the UE has data to transmit on the transport network, the UE could transmit a scheduling request to the NB, the NB could responsively select uplink PRBs to carry the data from the UE to the NB and could coordinate transmission of the data from the UE within those uplink PRBs.

As the industry advances from one generation of wireless technology to the next, UEs may need to support simultaneous connections on multiple RATs. With the transition from 4G to 5G, for instance, it is expected that UEs will be configured to support use of both technologies concurrently, with an arrangement referred to as EUTRA-NR Dual Connectivity (EN-DC). With such an arrangement, a UE might include both a 4G radio and a 5G radio, and the 4G radio could be served over a 4G connection by a 4G NB (e.g., an evolved-Node-B (eNB)) concurrently with the 5G radio being served over a 5G connection by a 5G NB (e.g., a gigabit-Node-B (gNB)). More generally, dual-connectivity involves a UE having a connection under a first RAT ("first-RAT connection") and a co-existing connection under a second RAT ("second-RAT connection") so that the UE can engage in packet-data communications concurrently on the two connections and thus concurrently under the first and second RATs. This is to be distinguished from standalone-connectivity, where the UE has connection under the first RAT but does not have a co-existing connection under the second RAT.

In a dual-connectivity scenario, where a UE is concurrently connected with two NBs respectively under the first and second RATs, one of the NBs could operate as a master NB, and the other NB could operate as a secondary NB. With such an arrangement, each NB could have a separate established access bearer for the UE. (For instance, in a "split-bearer" arrangement, separate access bearers could split off from a user-plane node such as an SGW or UPF, with one bearer homed to one NB and the other bearer homed to the other NB. Alternatively, a single access bearer could be homed to just one of the NBs, and that bearer could be split from that NB to extend via an inter-NB interface to the other NB.) But a control-plane for both of the UE's connections might be homed to just the master NB.

To configure dual-connectivity, the UE might first establish a first-RAT connection with a first NB, so that a control-plane homed to the first NB would be established, and an access bearer homed to the first NB would also be established. The first NB could then operate as a master NB to coordinate setup for the UE of a second-RAT connection with a second NB, with an associated access bearer homed to the second NB.

For instance, once a UE has established a 4G connection with an NB, that NB could operate a master NB to configure EN-DC for the UE. Namely, the master NB could direct the UE to scan for secondary 5G coverage. And upon receiving the UE's report of such detected coverage, the master NB could then engage in signaling with the UE and that other NB, to coordinate establishment of a secondary 5G connection between the UE and the other NB, with the other NB operating as secondary NB. Further the secondary NB could establish for the UE a context record indicating an identity of its established secondary 5G connection with the UE.

In addition, the master NB could engage in signaling over its control-plane signaling path with a core network control-plane node (e.g., MME or AMF/SMF), to trigger establishment for the UE of an access bearer homed to the secondary NB. And the control-plane node could engage in signaling with the secondary NB (e.g., via the control-plane signaling path homed to the master NB, and via inter-NB signaling between the master NB and the secondary NB) and with a core-network user-plane node (e.g., SGW or UPF), to coordinate establishment for the UE of a user-plane access bearer that extends through the core network from the secondary NB to a user-plane node (e.g., PGW or UPF). Further, the control-node, user-plane node, and NBs could update their UE context records accordingly.

With dual-connectivity so configured, the master and secondary NBs could serve the UE concurrently over their respective connections with the UE. For instance, when the core network receives data destined to the UE, some of the data could pass over one of the UE's access bearers to the master NB and other of the data could pass over the UE's other access bearer to the secondary NB. The master NB could thus schedule and provide transmission to the UE of the portion of the data that it received for transmission to the UE. And at the same time, the secondary NB could likewise schedule and provide transmission to the UE of the portion of the data that it received for transmission to the UE. Similarly, when the UE has data to transmit, the NBs could concurrently coordinate uplink transmission of respective portions of the data and could forward those portions of the data over the UE's respective access for output onto the transport network.

In addition to helping facilitate transition between RATs, this dual-connectivity arrangement could be particularly advantageous for a UE, as it could provide the UE with the opportunity to communicate with an increased peak data rate resulting from aggregation of the UE's master connection under the first RAT with the UE's secondary connection under the second RAT. Consequently, whenever a cellular wireless network can configure dual-connectivity service for a UE, it may be desirable for the network to configure that dual-connectivity service.

On the other hand, as a wireless service provider rolls out service under a new RAT, the wireless service provider may do so progressively at cell sites throughout its network. Therefore, during this transition, some of the cell sites in the network may support providing dual-connectivity under a first RAT and second RAT while other cell sites in the network may support just standalone-connectivity under the first RAT. For instance, during a transition from 4G to 5G, some of the network's cell sites may support providing EN-DC service but others may support providing just 4G service (possibly along with still older, legacy service).

In this situation, it may still be desirable to serve a UE with dual-connectivity whenever the UE is at a cell site that supports dual-connectivity. However, there is at least one class of UEs for which this may not work so well: UEs that are in motion. Although a UE in motion may benefit from the higher peak data rate of dual-connectivity service while within dual-connectivity coverage, there is a risk that such a UE may move out of that dual-connectivity coverage and into a cell site that supports just standalone-connectivity providing a lower peak data rate. And if that move occurs while the UE is engaged in data communication, the UE may experience an undesirable drop in available data rate.

The present disclosure provides a mechanism to help address this issue. In accordance with the disclosure, when a UE is served with standalone-connectivity under a first RAT in a cell site that also supports dual-connectivity service under the first RAT and a second RAT, a decision will be made as to whether to configure the dual-connectivity service for the UE, with the decision being based on whether the UE is moving threshold quickly. In particular, if the UE is moving at least predefined-threshold quickly, then, based at least on that fact, the decision will be to not configure the dual-connectivity service for the UE. Whereas, if the UE is not moving at least predefined-threshold quickly, then, based at least on that fact, the decision will be to configure the dual-connectivity service for the UE. The UE's serving network will then operate according to the decision, to control whether the UE is provided with dual-connectivity service.

Additional factors could also be taken into consideration in this process.

For example, the decision to not configure the dual-connectivity service for the UE if the UE is moving at least predefined-threshold quickly could be additionally based on a determination that the UE's serving cell site is adjacent to a cell site that supports standalone-connectivity under the first RAT and does not support dual-connectivity under the first RAT and the second RAT. And as another example, the decision to not configure the dual-connectivity service for the UE in that scenario could be additionally based on a determination that the UE is moving in a direction toward the adjacent cell site that supports standalone-connectivity under the first RAT and does not support dual-connectivity under the first RAT and the second RAT. Further, as yet another example, the decision to not configure the dual-connectivity for the UE if the UE is moving at least predefined-threshold quickly could be additionally based on a determination that the UE's serving cell site currently has predefined-threshold heavy load under the second RAT. Other examples are possible as well.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

Figure 1:
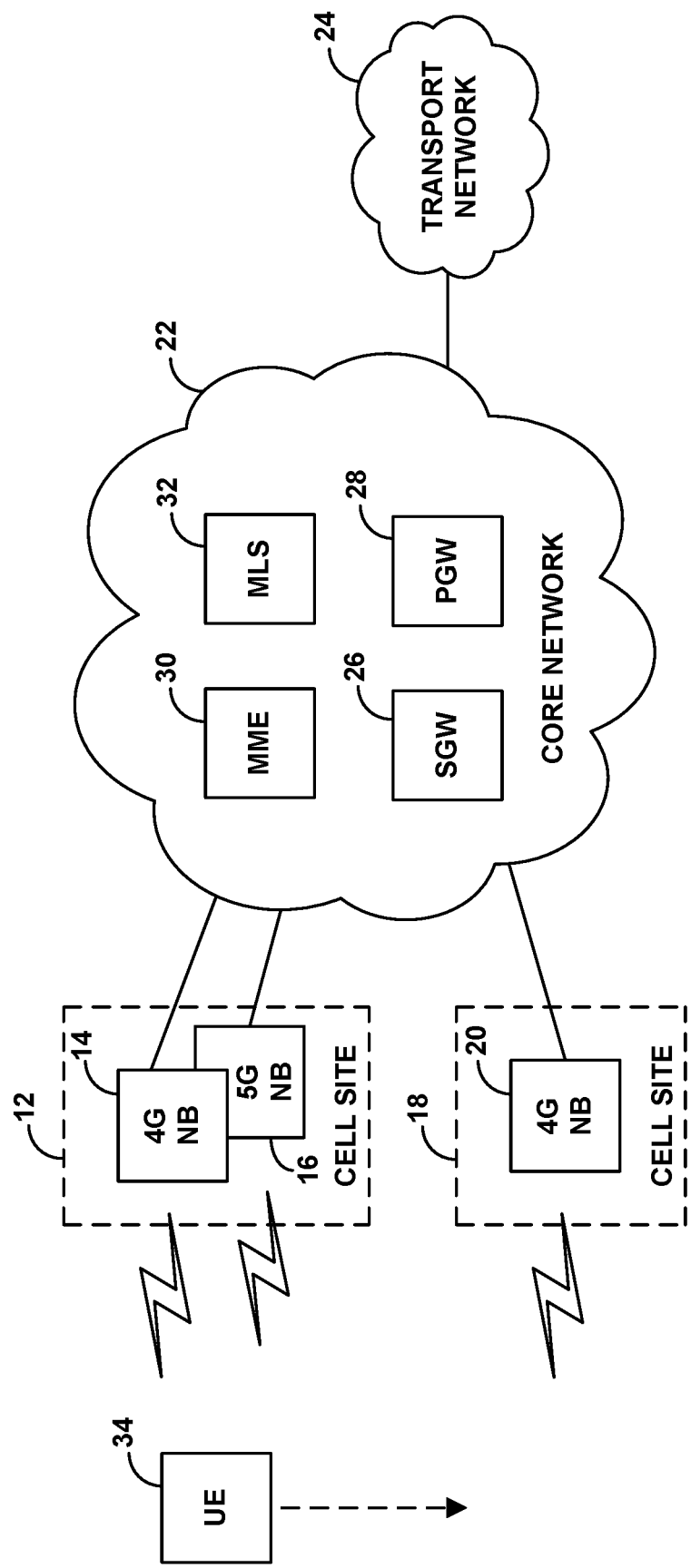
FIG. 1 is a simplified block diagram of an example wireless communication system in which various disclosed features can be implemented.

An example implementation will now be described in the context of 4G LTE and 5G NR service and particularly in the context of a network that includes some cell sites that support 4G-only service and EN-DC service and other cell sites that support 4G-only service but do not support EN-DC service. It should be understood, however, that the principles disclosed herein could extend to apply with respect to other scenarios as well, such as with respect to other RATs. Further, it should be understood that other variations from the specific arrangements and processes described are possible. For instance, various described entities, connections, functions, and other elements could be added, omitted, distributed, re-located, re-ordered, combined, or changed in other ways.

As noted above, FIG. 1 is a simplified block diagram of an example wireless communication system in which various disclosed features can be implemented. In particular, the figure depicts a representative arrangement including a first cell site 12 including a 4G NB 14 and a 5G NB 16, and a second cell site 18 including a 4G NB 20 but not including a 5G NB. (Note that these example cell sites might also support one or more other RATs aside from these, such as one or more legacy RATs for instance. But the focus of the example discussion here will be just 4G and 5G.)

Each of these cell sites could be at a respective location within a region, and the two example cell sites could be adjacent to each other such that a UE served by a NB of one cell site might move from that cell site to another cell site and might then be served by a NB of the other cell site.

In addition, each NB could also take various forms. For instance, a NB could be a macro NB of the type that would typically include a tower mounted antenna structure for providing a broad range of coverage. Or a NB could be a small cell NB, femtocell NB, relay NB, or other type of NB that might have a smaller form factor with an antenna structure that provides a narrower range of coverage. Further, at cell site 12, the two NBs might share an antenna tower and/or other such structures. Other arrangements are possible as well.

NBs 14, 16, and 20 are each shown coupled with an example core network 22. Core network 22 could be an enhanced packet core (EPC) network, a next generation core (NGC) network, or another network including components supporting an applicable radio access technology and providing connectivity with at least one transport network 24, such as the Internet.

In an example implementation as shown, the core network 22 includes a serving gateway (SGW) 26, a packet data network gateway (PGW) 28, a mobility management entity (MME) 30, and a mobile location system (MLS) 32. In practice, each NB could have an interface with the SGW and an interface with the MME, the MME could have an interface with the SGW, the SGW could have an interface with the PGW, and the PGW could provide connectivity with the transport network. Further, the MME could have an interface with the MLS.

With this arrangement, the SGW and PGW cooperatively provide user-plane connectivity between each NB and the transport network, to enable a UE served by a NB to engage in communication on the transport network. And the MME operates as a controller to carry out operations such as coordinating UE attachment and setup of user-plane bearers. Further, the MLS could operate to determine (e.g., track) geographic location of UEs using techniques such as trilateration, multilateration (e.g., observed time difference of arrival (OTDOA)), satellite-based positioning, or the like.

As noted above, the air interface between each NB and UEs within its coverage could be structured to define various air-interface resources.

For instance, in the time domain, the air interface could define a continuum of 10-millisecond (ms) frames, each divided into ten 1-ms subframes, and each subframe could be further divided into a number of timeslots, each additionally divided into symbol time segments. And in the frequency domain, the bandwidth of each carrier on which the NB operates could be divided into subcarriers with specified subcarrier spacing on the order of 15 to 240 kHz. With this arrangement, the air interface on each carrier would define an array of resource elements each occupying a subcarrier and symbol time segment, and the NB and UEs could communicate with each other through modulation of the subcarriers to carry data in those resource elements. Variations of this arrangement are possible as well.

Further, particular groupings of resource elements on the air interface could be grouped together to define the PRBs discussed above. In an example implementation, each PRB could span one timeslot in the time domain and a group of subcarriers in the frequency domain. Depending on the carrier bandwidth, the air interface could thus support a certain number of such PRBs across the bandwidth of the carrier within each timeslot.

In addition, certain resource elements on the downlink and uplink could be reserved for particular control-channel or shared-channel communications.

For instance, on the downlink, certain resource elements per subframe (or per downlink subframe in TDD) could be reserved to define a downlink control region for carrying control signaling such as scheduling directives and acknowledgements from the NB to UEs. And other resource elements per subframe could be reserved to define a shared channel in which PRBs could carry scheduled data communications from the NB to UEs.

Further, in certain subframes, a group of resource elements centered on the center frequency of each carrier could be reserved to carry synchronization signals that UEs could detect as a way to discover coverage of the NB on the carrier and to establish frame timing. And in certain subframes, a group of resource elements also centered on the center frequency of the carrier could be reserved to define a broadcast-channel for carrying system information messages, such as master information block (MIB) and system information block (SIB) messages that WCDs could read to obtain operational parameters such as carrier bandwidth and other information. Further, certain resource elements distributed in a predefined pattern throughout the carrier bandwidth per subframe could be reserved to carry reference signals that UEs could measure as a basis to evaluate coverage strength and quality and to provide channel estimates to facilitate precoding, beamforming, or the like.

On the uplink, on the other hand, certain resource elements per subframe (or per uplink subframe in TDD) could be reserved to define an uplink control region for carrying control signaling such as access requests, channel-quality reports, scheduling requests, and acknowledgements, from UEs to the NB. And other resource elements per subframe could be reserved to define a shared channel in which PRBs could carry scheduled data communications from UEs to the NB. Further, still other resources on the uplink could be reserved for other purposes as well, such as for carrying uplink reference signals or the like.

Note also that the 4G air interface and service provided respectively by 4G NBs 14 and 20 could differ from the 5G air interface and service provided by 5G NB 16 in various ways now known or later developed. For example, one may provide variable subcarrier spacing, but the other may provide fixed subcarrier spacing. As another example, one may have different symbol time segments than the other. As still another example, one may make use of different MIMO technologies than the other. And as yet another example, with TDD carriers, one may have a flexible TDD configuration and the other may have a fixed TDD configuration. Other examples are possible as well.

In operation, when a UE enters into coverage of the NB on a carrier, the UE could detect the NB's synchronization signal and could then read the NB's MIB or the like to determine the carrier's bandwidth. The UE could then engage in random access signaling and Radio Resource Control (RRC) configuration signaling with the NB to connect with the NB on the carrier, thus putting the UE in an RRC-connected mode.

Once the UE is connected with the NB, the UE could then transmit to the NB an attach request if appropriate, which the NB could forward to the MME for processing. And after authenticating the UE, the MME could coordinate setup for the UE of one or more user-plane bearers between the NB and the PGW, to enable the UE to engage in communication on the transport network. Further, the NB could establish for the UE a context record indicating operational state of the UE, and the NB could receive from the UE and/or the HSS (via the MME) a set of capabilities and profile data for the UE and could store that data in the context record for reference while serving the UE.

The NB could then serve the UE with data communications.

For instance, when data arrives at the NB for transmission to the UE, the NB could allocate one or more downlink PRBs in a subframe for use to transmit at least a portion of the data, defining a transport block, to the UE. The NB could then transmit to the UE in the control region of that subframe a Downlink Control Information (DCI) message that designates the PRBs, and the NB could accordingly transmit the transport block to the UE in those designated PRBs.

And when the UE has data to transmit to the NB (e.g., for transmission on the transport network), the UE could transmit to the NB a scheduling request that carries with it a buffer status report (BSR) indicating how much data the UE has buffered for transmission. And in response the NB, could allocate one or more uplink PRBs in an upcoming subframe for carrying a transport block of that data from the UE and could transmit to the UE a DCI message that designates those upcoming PRBs. The UE could then accordingly transmit the transport block to the NB in the designated PRBs.

While the NB is so serving a connected UE, the UE could also transmit various operational information to the NB to assist with the NB's allocation of PRBs and other service of the UE.

By way of example, the UE could regularly evaluate and report the quality of its coverage from the NB, and the NB could use the UE's reported coverage quality as a basis to configure air interface transmission and/or for other purposes. For instance, the UE could regularly evaluate channel quality based on signal-to-interference-plus-noise ratio (SINR) and could periodically report to the NB a channel-quality-indicator (CQI) value that represents the determined level of quality. And the NB could use the UE's latest reported CQI value as a basis to configure a modulation and coding scheme for use in air interface communication between the NB and the UE. Further, the UE could regularly evaluate and report reference signal receive quality (RSRQ), and the NB could use the reported RSRQ to control UE mobility or for other purposes. In addition, the UE might include within each of its CQI and/or RSRQ reports to the NB an indication of the UE's current geographic location, which the UE might determine by use of GPS or other technology.

FIG. 1 depicts a representative UE 34 that is currently in coverage of cell site 14, and particularly in coverage of both 4G NB 14 and 5G NB 16. In a representative implementation, UE 34 is configured with a 4G radio and associated components to establish a 4G connection with a 4G NB and to be served according to 4G over that connection, and UE 34 also includes a 5G radio and associated components to establish a 5G connection with a 5G NB and to be served according to 5G over that connection. Further, UE 34 supports standalone 4G service, where the UE would have a 4G connection and no 5G connection as discussed above, and UE 34 further supports EN-DC, where the UE has co-existing 4G and 5G connections as discussed above.

In a representative implementation as discussed above, UE 34 may have standalone-connectivity with 4G NB 14, and at issue may be whether 4G NB 14 should configure EN-DC service for the UE or rather whether the 4G NB should continue to serve the UE with standalone 4G connectivity. For instance, at issue may be whether 4G NB 14 should have UE 34 scan for 5G coverage so that, upon receipt from the UE of a report that the UE has detected threshold strong coverage of 5G NB 16, the 4G NB would then coordinate setup of a secondary 5G connection for the UE with 5G NB 16. Or at issue may be whether the 4G NB should coordinate setup of that secondary 5G connection for the UE.

The 4G NB may encounter this question in various situations. For instance, the 4G NB may determine that the UE is engaged in, or will engage in, a particular type of communication that could benefit from EN-DC service. As EN-DC can provide increased peak data rate, for example, the 4G NB might determine that the UE is going to engage in relatively high-throughput communication (such as video streaming or the like) and may responsively consider configuring EN-DC service for the UE. Other triggers and bases for possibly configuring EN-DC service for the UE may be possible as well.

In line with the discussion above, the 4G NB could base its decision of whether to configure EN-DC service for the UE on a determination of whether the UE is moving threshold fast. If the UE is moving threshold fast, there may be a risk that the UE would move from coverage of cell site 12 to coverage of cell site 18 and, as a result, may transition from being served with EN-DC by NBs 14 and 16 to being served instead with standalone 4G service by NB 20. Consequently, if the UE is moving threshold fast, then 4G NB 14 may responsively decide to not configure EN-DC service for the UE, so as to avoid having the UE experience the service discontinuity of transitioning from EN-DC service to 4G-only service. Whereas, if the UE is not moving threshold fast, then the 4G NB 14 may responsively decide to configure EN-DC service for the UE, with the understanding that there is minimal if any risk that the UE may move from cell site 12 to cell site 14.

The 4G NB 14 could determine in various ways how fast the UE is moving. For example, the 4G NB 14 might receive from the UE and/or from MLS 32 timestamped reports of the UEs location from time to time and may compute the UE's speed of movement based on those locations and timestamps. Alternatively, the 4G NB 14 might receive from the UE and/or from MLS 32 a report of the UE's speed of movement from time to time. Other examples are possible as well.

Given a latest determination of how fast the UE is moving, the 4G NB could then determine whether the UE's speed of movement is at least as high as a predefined threshold. This threshold could be set by engineering design to a level of speed that is fast enough to present a reasonable risk that the UE may leave coverage of cell site 12 and transition to service of cell site 14 or another cell site that provides just standalone 4G service and does not provide EN-DC service (i.e., a 4G-only cell site).

If the 4G NB thus determines that the UE is moving at least predefined-threshold quickly, then, based at least on that determination, the 4G NB may decide to not configure EN-DC service for the UE. Whereas, if the 4G NB thus determines that the UE is not moving at least predefined-threshold quickly (e.g., that the UE is not moving at all or is moving at a speed that is lower than the predefined threshold), then, based at least on that determination, the 4G NB may decide to configure EN-DC service for the UE.

Further in line with the discussion above, this decision by the 4G NB could take into account additional factors.

For example, as the concern is that a fast moving UE may transition from being served with EN-DC to being served with just standalone 4G, the 4G NB could also take into consideration whether a cell site adjacent to cell site 12 provides is a 4G-only cell site. The 4G NB might make this determination by referring to neighbor NB data that the 4G NB maintains for purposes of handover or the like. Such neighbor data could be configured to indicate whether any neighboring cell site is a 4G-only cell site. In the arrangement of FIG. 1, for instance, the data could indicate that at least neighboring cell site 18 is a 4G-only cell site, as cell site 18 does not include a 5G NB.

If the 4G NB thus determines that the UE is moving at least predefined-threshold quickly and that an adjacent cell site is a 4G-only cell site, then, based at least on that determination, the 4G NB may decide to not configure EN-DC service for the UE. Whereas, if the 4G NB determines that the UE is moving at least predefined-threshold quickly but that each cell site adjacent to cell site 12 also provides EN-DC service, then, based at least on that determination, the 4G NB may decide to configure EN-DC service for the UE.

Further, in a scenario where an adjacent cell site is a 4G-only cell site and where the UE is moving threshold quickly, the 4G NB could additionally take into consideration whether the UE is moving in a path toward that adjacent cell site, such that the UE is more likely to transition from being served with EN-DC by cell site 12 to being served with just standalone 4G by the adjacent cell site.

To evaluate this issue, the 4G NB might plot the UE's locations and apply linear regression and/or another algorithm to estimate a path along which the UE is moving, and the 4G NB might extrapolate to determine whether that path will lead into a predefined geographic coverage of the adjacent 4G-only cell site. Alternatively or additionally, the 4G NB might take into account map data in terms of roads or other paths along which a UE may be more likely to move, and the 4G NB might consider whether the UE's location points have been along that path and, based on the path, whether the UE is headed into coverage of the adjacent 4G-only cell site. Other processes could be possible as well.

If the 4G NB thus determines that the UE is moving threshold fast toward an adjacent 4G-only cell site, then, based at least on that determination, the 4G NB may decide to not configure EN-DC service for the UE. Whereas, if the 4G NB determines that the UE is moving threshold fast but not toward an adjacent cell site that supports EN-DC service, then based at lease on that determination, the 4G NB may decide to configure EN-DC service for the UE.

Still further, the 4G NB might also take into account the load of 5G NB 16 that would likely provide the UE with 5G connectivity to facilitate EN-DC service. For instance, the 4G NB could engage in inter-NB signaling with the 5G NB to determine how loaded the 5G NB is, in terms of percent PRB utilization over recent time, quantity of UEs served, and/or other metrics. And the 4G NB could determine if the 5G NB's level of load is at least as high as a predefined threshold deemed to represent heavy load.

If the 4G NB thus determines that the 5G NB is threshold heavily loaded, then, based at least on that determination, the 4G NB may decide to not configure EN-DC connectivity for the UE. Whereas, if the 4G NB determines that the 5G NB is not threshold heavily loaded, then, based at least on that determination along with the analysis described above, the 4G NB may decide to configure EN-DC service for the UE.

Once the 4G NB has thus decided whether or not to configure EN-DC service for the UE, the 4G NB could then operate in accordance with the decision. Namely, if the 4G NB decided to configure EN-DC service for the UE, then the 4G NB could proceed to configure EN-DC service for the UE, so that the UE will then be served in cell site 12 with EN-DC service. Whereas, if the 4G NB decided to not configure EN-DC service for the UE, then the 4G NB could forgo configuring EN-DC service for the UE and could instead continue to serve the UE in cell site 12 with standalone 4G service.

Figure 2:
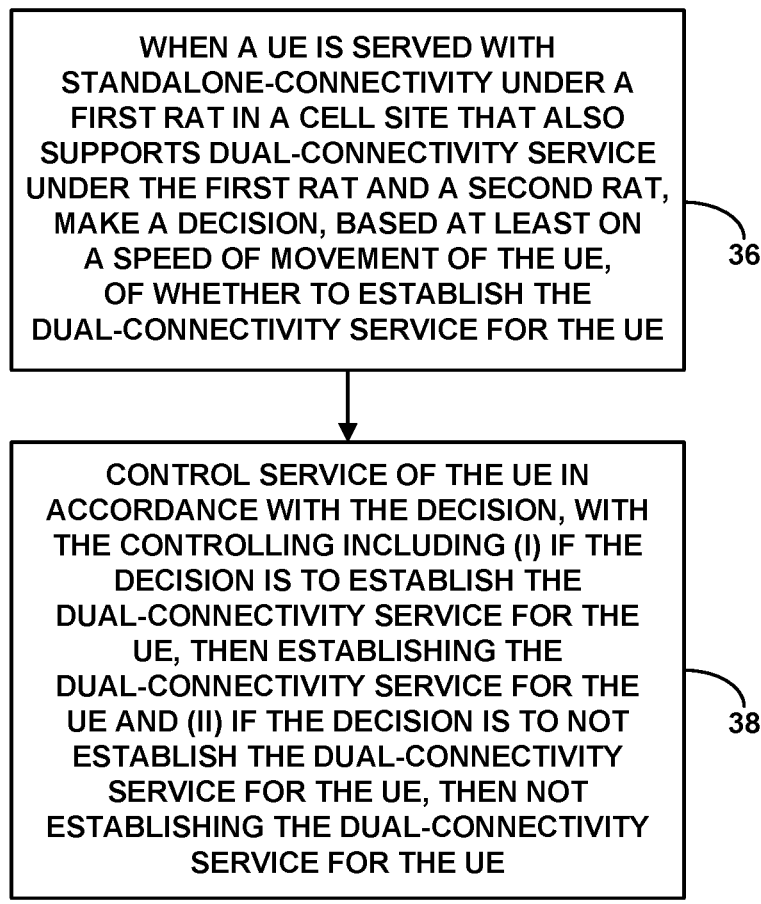
FIG. 2 is a flow chart depicting an example method in accordance with the present disclosure.

FIG. 2 is a flow chart depicting a method that can be carried out in accordance with the present disclosure, to control service of a UE. This method could be carried out by or on behalf of a NB such as NB 14 discussed above, or by or on behalf of one or more other entities.

As shown in FIG. 2, at block 36, the method includes, when the UE is served with standalone-connectivity under a first RAT in a cell site that also supports dual-connectivity service under the first RAT and a second RAT, making a decision, based at least on a speed of movement of the UE, of whether to establish the dual-connectivity service for the UE. And at block 38, the method includes controlling service of the UE in accordance with the decision, with the controlling including (i) if the decision is to establish the dual-connectivity service for the UE, then establishing the dual-connectivity service for the UE and (ii) if the decision is to not establish the dual-connectivity service for the UE, then not establishing the dual-connectivity service for the UE.

In line with the discussion above, in this method, the act of making the decision, based at least on the speed of movement of the UE, of whether to establish the dual-connectivity service for the UE could involve (a) making a determination of whether the UE is moving at least predefined-threshold quickly, (b) if the determination is that the UE is moving at least predefined-threshold quickly, then, based at least on the determination, deciding to not establish the dual-connectivity service for the UE, and (c) if the determination is that the UE is not moving at least predefined-threshold quickly, then, based at least on the determination, deciding to establish the dual-connectivity service for the UE.

Further, the act of making the determination of whether the UE is moving at least predefined-threshold quickly could involve (a) determining a speed of movement of the UE and (b) determining whether the speed of movement is at least as high as a predefined threshold speed.

Still further, the cell site could be a first cell site, and the act of deciding, based at least on the determination that the UE is moving at least predefined-threshold quickly, to not establish the dual-connectivity service for the UE could be additionally based on the first cell site being adjacent to a second cell site that supports providing service under the first RAT but does not support providing concurrent under the first RAT and the second RAT. And the act of deciding, based at least on the determination that the UE is moving at least predefined-threshold quickly, to not establish the dual-connectivity service for the UE could still additionally be based on the UE moving in a direction toward the second cell site.

Yet further, the cell site could be configured to provide service under the first RAT (first-RAT service) and to provide service under the second RAT (second-RAT service), and the act of deciding, based at least on the determination that the UE is moving at least predefined-threshold quickly, to not establish the dual-connectivity service for the UE could be additionally based on a determination that the second-RAT service of the cell site is at least predefined-threshold heavily loaded, such as that that a NB that provides the second-RAT service in the cell site has threshold heavy load on its air interface or otherwise.

And still further, the act of deciding, based at least on the determination that the UE is not moving at least predefined-threshold quickly, to establish the dual-connectivity service for the UE could be additionally based on a type of communication in which the UE engages. For instance, an initial trigger for considering establishment of the dual-connectivity service for the UE might be a determination that the UE will engage in data-intensive communication and/or latency-sensitive communication.

And yet further, the UE may be served with the standalone-connectivity through a first-RAT connection between the UE and a first NB, and the act of establishing the dual-connectivity service for the UE could involve the first NB coordinating setup for the UE of a co-existing second-RAT connection between the UE and a second NB, to enable the UE to be served with packet-data communications concurrently through the first-RAT connection with the first NB and the second-RAT connection with the second NB. In this process, the first NB and second NB could be collocated at the cell site, so that the dual-connectivity could be set up for the UE at the cell site.

Figure 3:
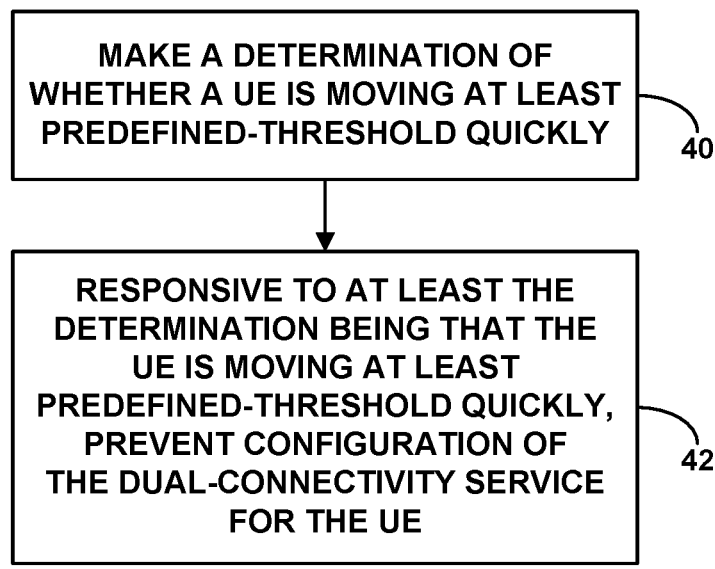
FIG. 3 is another flow chart depicting an example method in accordance with the present disclosure.

FIG. 3 is next another flow chart depicting operations that could be carried out in accordance with this disclosure, to control service of a UE when the UE is served with standalone-connectivity under a first RAT in a cell site that also supports dual-connectivity service under the first RAT and a second RAT. As shown in FIG. 3, at block 40, the method includes making a determination of whether the UE is moving at least predefined-threshold quickly. And at block 42, the method includes, responsive to at least the determination being that the UE is moving at least predefined-threshold quickly, preventing configuration in the cell site of the dual-connectivity service for the UE. Various features described above can be implemented in this context, and vice versa.

Figure 4:
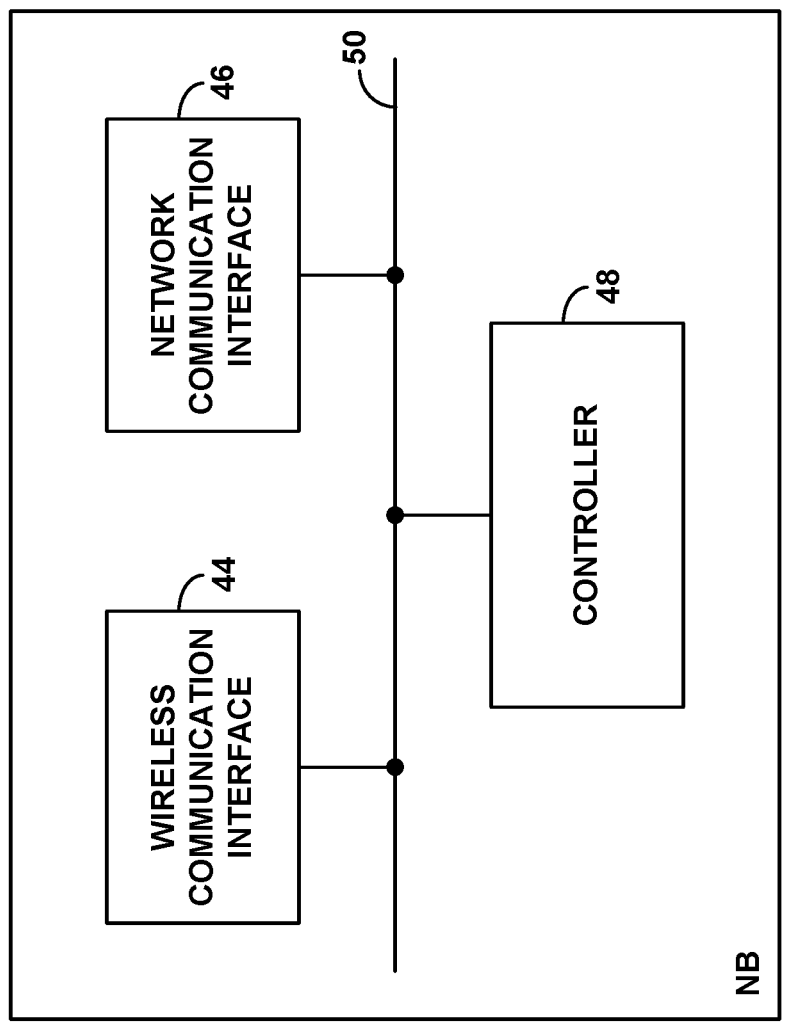
FIG. 4 is a simplified block diagram of an example NB operable in accordance with the present disclosure.

Features discussed above could also be provided in the form of a system configured to control service of a UE. Such a system could include a first NB configured to provide first-RAT service and a second NB configured to provide second-RAT service, the first NB and second NB being located at a common cell site. FIG. 4 is a simplified block diagram depicting an example of the first NB in that context.

As shown in FIG. 4, the example first NB includes a wireless communication interface 44, a network communication interface 46, and a controller 48, all of which may be communicatively linked together by a system bus, network, or other connection mechanism 50.

In this arrangement, the wireless communication interface 44 could be configured to provide cellular coverage and service according to the first RAT, engaging in air-interface communication with served UEs. As such, wireless communication interface 44 could comprise an antenna structure, which could be tower mounted or could take other forms, and associated components such as a power amplifier and a wireless transceiver, so as to facilitate providing a coverage area defining an air interface having a downlink and an uplink and engaging in transmission and reception of bearer and control data over the air interface in accordance with the first RAT.

Network communication interface 46 could comprise a wired or wireless interface, such as an Ethernet network communication interface, configured to support communication with other entities, such as entities on a core network for instance.

And controller 48 could comprise control logic to cause the first NB to carry out particular operations including those discussed above. As such, the controller 48 could take various forms, including but not limited to a processing unit including one or more processors (e.g., general purpose microprocessors and/or dedicated processing units) and non-transitory data storage (e.g., one or more volatile and/or non-volatile storage components, such as magnetic, optical, or flash storage) holding, storing, encoded with, or otherwise embodying or having program instructions executable by the processing unit to cause the first NB to carry out the described operations.

As discussed above, the operations could include, when the first NB is serving the UE with standalone-connectivity under the first RAT, making a decision, based at least on a speed of movement of the UE, of whether to establish the dual-connectivity service for the UE in which the UE would concurrently receive the first-RAT service from the first NB and the second-RAT service from the second NB. And the operations could then further include controlling service of the UE in accordance with the decision, with the controlling including (i) if the decision is to establish the dual-connectivity service for the UE, then establishing the dual-connectivity service for the UE, such as by coordinating with the second NB and the core network to configure set up a second-RAT connection for the UE and so forth as discussed above, and (ii) if the decision is to not establish the dual-connectivity service for the UE, then not establishing the dual-connectivity service for the UE but rather continuing to serve the UE with standalone service under the first RAT.

Various features described above can be implemented in this context as well, and vice versa.

Exemplary embodiments have been described above. Those skilled in the art will understand, however, that changes and modifications may be made to these embodiments without departing from the true scope and spirit of the invention.

We claim:

1. A method for controlling service of a user equipment device (UE), the method comprising:
 when the UE is served with standalone-connectivity under a first radio access technology (RAT) in a cell site that also supports dual-connectivity service under the first RAT and a second RAT, making a decision, based at least on a speed of movement of the UE, of whether to establish the dual-connectivity service for the UE; and
 controlling service of the UE in accordance with the decision, wherein the controlling includes (i) if the decision is to establish the dual-connectivity service for the UE, then establishing the dual-connectivity service for the UE and (ii) if the decision is to not establish the dual-connectivity service for the UE, then not establishing the dual-connectivity service for the UE,
 wherein the UE is served with the standalone-connectivity through a first connection under the first RAT ("first-RAT connection") between the UE and a first Node-B (NB), and wherein establishing the dual-connectivity service for the UE comprises coordinating by the first NB setup for the UE of a co-existing second connection under the second RAT ("second-RAT connection") between the UE and a second NB, to enable the UE to be served with packet-data communications concurrently through the first-RAT connection with the first NB and the second-RAT connection with the second NB,
 wherein the first NB and second NB are collocated, sharing a common antenna tower, and
 wherein making the decision, based at least on the speed of movement of the UE, of whether to establish the dual-connectivity service for the UE is based on whether a speed of movement of the UE is at least as high as a predefined threshold speed.

2. The method of claim 1, wherein making the decision, based at least on the speed of movement of the UE, of whether to establish the dual-connectivity service for the UE comprises:
 making a determination of whether the UE is moving at least as quickly as the predefined threshold speed;
 if the determination is that the UE is moving at least as quickly as the predefined threshold speed, then, based at least on the determination, deciding to not establish the dual-connectivity service for the UE; and
 if the determination is that the UE is not moving at least as quickly as the predefined threshold speed, then, based at least on the determination, deciding to establish the dual-connectivity service for the UE.

3. The method of claim 2, wherein making the determination of whether the UE is moving at least as quickly as the predefined threshold speed comprises:
 determining the speed of movement of the UE; and
 determining whether the speed of movement is at least as high as the predefined threshold speed.

4. The method of claim 2, wherein the cell site is a first cell site, and wherein deciding, based at least on the determination that the UE is moving at least as quickly as the predefined threshold speed, to not establish the dual-connectivity service for the UE is further based on the first cell site being adjacent to a second cell site that supports providing service under the first RAT but does not support providing service concurrent under the first RAT and the second RAT.

5. The method of claim 4, wherein deciding, based at least on the determination that the UE is moving at least as quickly as the predefined threshold speed, to not establish the dual-connectivity service for the UE is further based on the UE moving in a direction toward the second cell site.

6. The method of claim 2, wherein deciding, based at least on the determination that the UE is moving at least as quickly as the predefined threshold speed, to not establish the dual-connectivity service for the UE is further based on a determination that load of the second NB under the second RAT is at least as high as a predefined threshold load.

7. The method of claim 2, wherein deciding, based at least on the determination that the UE is not moving at least as quickly as the predefined threshold speed, to establish the dual-connectivity service for the UE is further based on a type of communication in which the UE engages.

8. The method of claim 1, wherein the first RAT is 4G LTE and wherein the second RAT is 5G NR.

9. The method of claim 1, wherein making the decision of whether to establish the dual-connectivity service for the UE comprises making the decision of whether to establish for the UE the dual-connectivity service in the cell site.

10. A method for controlling service of a user equipment device (UE) when the UE is served with standalone-connectivity under a first radio access technology (RAT) in a cell site that also supports dual-connectivity service under the first RAT and a second RAT, the method comprising:
 making a determination of whether the UE is moving at least as quickly as a predefined threshold speed, wherein the determination of whether the UE is moving at least as quickly as possible is based on whether a speed of movement of the UE is at least as high as the predefined threshold speed; and
 responsive to at least the determination being that the UE is moving at least as quickly as the predefined threshold speed, preventing configuration in the cell site of the dual-connectivity service for the UE,
 wherein the UE is served with the standalone-connectivity through a first connection under the first RAT ("first-RAT connection") between the UE and a first Node-B (NB), and wherein configuration in the cell site of the dual-connectivity service for the UE comprises coordinating by the first NB setup for the UE of a coexisting second connection under the second RAT ("second-RAT connection") between the UE and a second NB, to enable the UE to be served with packet-data communications concurrently through the first-RAT connection with the first NB and the second-RAT connection with the second NB, and wherein the first NB and second NB are collocated, sharing a common antenna tower.

11. A system configured to control service of a user equipment device (UE), the system comprising:

a first Node-B (NB) configured to provide service under a first radio access technology ("first-RAT service"); and a second NB configured to provide service under a second RAT ("second-RAT service"), the first NB and second NB being collocated at a common cell site, sharing a common antenna tower wherein the first NB includes a wireless communication interface through which the first NB is configured to provide the first-RAT service, a network communication interface though which the first NB is configured to communicate on a core network, and a controller configured to cause the first NB to carry out operations comprising:

when the first NB is serving the UE with standalone-connectivity under the first RAT, making a decision, based at least on a speed of movement of the UE, of whether to establish the dual-connectivity service for the UE in which the UE would concurrently receive the first-RAT service from the first NB and the second-RAT service from the second NB, and controlling service of the UE in accordance with the decision, wherein the controlling includes (i) if the decision is to establish the dual-connectivity service for the UE, then establishing the dual-connectivity service for the UE and (ii) if the decision is to not establish the dual-connectivity service for the UE, then not establishing the dual-connectivity service for the UE, wherein making the decision, based at least on the speed of movement of the UE, of whether to establish the dual-connectivity service for the UE is based on whether a speed of movement of the UE is at least as high as a predefined threshold speed.

12. The system of claim 11, wherein making the decision, based at least on the speed of movement of the UE, of whether to establish the dual-connectivity service for the UE comprises:

making a determination of whether the UE is moving at least as quickly as the predefined threshold speed;

if the determination is that the UE is moving at least as quickly as the predefined threshold speed, then, based at least on the determination, deciding to not establish the dual-connectivity service for the UE; and if the determination is that the UE is not moving at least as quickly as the predefined threshold speed, then, based at least on the determination, deciding to establish the dual-connectivity service for the UE.

13. The system of claim 12, wherein making the determination of whether the UE is moving at least as quickly as the predefined threshold speed comprises:

determining a speed of movement of the UE; and determining whether the speed of movement is at least as high as the predefined threshold speed.

14. The system of claim 12, wherein the cell site is a first cell site, and wherein deciding, based at least on the determination that the UE is moving at least as quickly as the predefined threshold speed, to not establish the dual-connectivity service for the UE is further based on the first cell site being adjacent to a second cell site that supports providing service under the first RAT but does not support providing concurrent service under the first RAT and the second RAT.

15. The system of claim 14, wherein deciding, based at least on the determination that the UE is moving at least as quickly as the predefined threshold speed, to not establish the dual-connectivity service for the UE is further based on the UE moving in a direction toward the second cell site.

16. The system of claim 12, wherein deciding, based at least on the determination that the UE is moving at least as quickly as the predefined threshold speed, to not establish the dual-connectivity service for the UE is further based on a determination that load of the second NB under the second RAT is at least as high as a predefined threshold load.

17. The system of claim 12, wherein deciding, based at least on the determination that the UE is not moving at least as quickly as the predefined threshold speed, to establish the dual-connectivity service for the UE is further based on a type of communication in which the UE engages.

18. The system of claim 11, wherein the first RAT is 4G LTE and wherein the second RAT is 5G NR.

* * * * *